United States Patent
Walters

(10) Patent No.: US 9,938,724 B2
(45) Date of Patent: Apr. 10, 2018

(54) ADAPTABLE OPERATING ROOM CEILING SYSTEMS

(71) Applicant: Mark W. Walters, Palmer, TX (US)

(72) Inventor: Mark W. Walters, Palmer, TX (US)

(73) Assignee: WALTERS HEALTHCARE RESOURCES, INC., Palmer, TX (US)

( * ) Notice: Subject to any disclaimer, the term of this patent is extended or adjusted under 35 U.S.C. 154(b) by 287 days.

(21) Appl. No.: 14/636,885

(22) Filed: Mar. 3, 2015

(65) Prior Publication Data

US 2016/0258165 A1 Sep. 8, 2016

(51) Int. Cl.
| | |
|---|---|
| *E04F 13/074* | (2006.01) |
| *H02G 3/34* | (2006.01) |
| *E04B 9/00* | (2006.01) |
| *E04B 9/18* | (2006.01) |
| *F21V 33/00* | (2006.01) |
| *F21S 8/04* | (2006.01) |
| *H02G 3/04* | (2006.01) |
| *H02G 3/00* | (2006.01) |
| *H02G 3/38* | (2006.01) |
| *F21W 131/205* | (2006.01) |
| *E04B 9/02* | (2006.01) |
| *F21S 2/00* | (2016.01) |

(52) U.S. Cl.
CPC .............. *E04F 13/074* (2013.01); *E04B 9/00* (2013.01); *E04B 9/003* (2013.01); *E04B 9/006* (2013.01); *E04B 9/18* (2013.01); *F21S 8/046* (2013.01); *F21V 33/0068* (2013.01); *H02G 3/0437* (2013.01); *H02G 3/263* (2013.01); *H02G 3/34* (2013.01); *H02G 3/381* (2013.01); *E04B 9/02* (2013.01); *F21S 2/00* (2013.01); *F21W 2131/205* (2013.01); *H02G 3/0418* (2013.01)

(58) Field of Classification Search
CPC .... E04B 9/00; E04B 9/18; E04B 9/003; E04F 13/074; F21S 8/046; F21V 33/0068; F21W 2131/205; F21Y 2101/02
USPC .......................................................... 52/28
See application file for complete search history.

(56) References Cited

U.S. PATENT DOCUMENTS

| | | | | |
|---|---|---|---|---|
| 3,685,235 A | * | 8/1972 | Lang ..................... | A47H 1/04 454/292 |
| 4,626,747 A | * | 12/1986 | Nilssen ................ | H05B 41/245 315/161 |
| 4,631,648 A | * | 12/1986 | Nilssen ................... | E04B 9/006 174/491 |
| 4,651,059 A | * | 3/1987 | Nilssen .................. | H05B 41/24 315/182 |
| 5,479,326 A | * | 12/1995 | Nilssen .................... | F21S 2/00 315/294 |
| 5,691,603 A | * | 11/1997 | Nilssen ............. | H02M 7/53832 315/209 R |
| 5,870,450 A | * | 2/1999 | Khutoryansky ..... | A61B 6/4283 378/181 |

(Continued)

*Primary Examiner* — Charles A Fox
*Assistant Examiner* — James J Buckle, Jr.
(74) *Attorney, Agent, or Firm* — Russell Ng PLLC; Michael R. Long

(57) ABSTRACT

An operating room ceiling system includes an air diffuser assembly, a raceway assembly, and a light assembly. The raceway assembly is positioned along an outer perimeter of the air diffuser assembly. The light assembly is positioned along an outer perimeter of the raceway assembly. The raceway assembly provides a raceway to facilitate cable routing.

16 Claims, 11 Drawing Sheets

(56) References Cited

U.S. PATENT DOCUMENTS

| | | | | |
|---|---|---|---|---|
| 6,439,736 B1* | 8/2002 | Fiene | ................... | E04B 9/32 |
| | | | | 362/147 |
| 8,112,942 B2* | 2/2012 | Bohm | ................... | A61G 10/00 |
| | | | | 52/220.1 |
| 8,905,585 B2* | 12/2014 | Dallam | ................... | A61B 19/26 |
| | | | | 362/227 |
| 2003/0002279 A1* | 1/2003 | Fiene | ................... | E04B 9/32 |
| | | | | 362/147 |
| 2015/0159374 A1* | 6/2015 | Dallam | ................... | A61B 19/26 |
| | | | | 52/28 |

* cited by examiner

ADAPTABLE OPERATING ROOM CEILING SYSTEMS

BACKGROUND

This disclosure relates generally to ceiling systems and, more specifically, to adaptable operating room ceiling systems.

A first approach that has traditionally been utilized to upgrade or add ceiling mounted equipment in an operating room has included shutting down an operating room following selection of new equipment and a location for the new equipment. Containment barriers have been installed and a ceiling of the operating room has then been opened. The ceiling space above a surgical table location has then been cleared to make room for structural support required for the new equipment and items (e.g., medical gas lines, electrical power cables, and communication cables) that are in the way are re-routed. Connections required for the new equipment have then been installed. The new equipment has then been installed and the contamination barriers have then been removed. Finally, the operating room has been cleaned.

The first approach has not been particularly desirable for a number of reasons. For example, the operating room may be shut down for an extended period of time and revenue that would have been generated by the operating room during renovation is lost. Moreover, such a renovation is relatively expensive and potential obstacles above an operating room ceiling may prevent locating new equipment in a desired location. Furthermore, the first approach is limited as to future upgrades, as major equipment changes again require extensive renovation due to limited or no potential to adapt to future equipment changes.

A second approach that has traditionally been utilized to upgrade or add ceiling mounted equipment in an operating room has included utilizing existing structural supports for the old equipment to support the new equipment. In this case, containment barriers, if needed, have been put in place and the old equipment has been removed. Various universal plates have then been installed to be utilized to connect the new equipment to the existing structural support. Required service connections for the new equipment have then been installed and the new equipment has then been installed. The contamination barriers have then been removed and the operating room has been cleaned.

The second approach has also not been particularly desirable for a number of reasons. For example, no change can be made to equipment locations, which results in the potential for suboptimal equipment placement. Furthermore, the second approach is also limited as to future upgrades, as major equipment changes require extensive renovation due to limited or no potential to adapt to future equipment changes.

SUMMARY

An operating room ceiling system includes an air diffuser assembly, a raceway assembly, and a light assembly. The raceway assembly is positioned along an outer perimeter of the air diffuser assembly. The light assembly is positioned along an outer perimeter of the raceway assembly. The raceway assembly is configured to provide a raceway to facilitate routing of cables, medical gas lines, and electrical conduit for electrical power.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
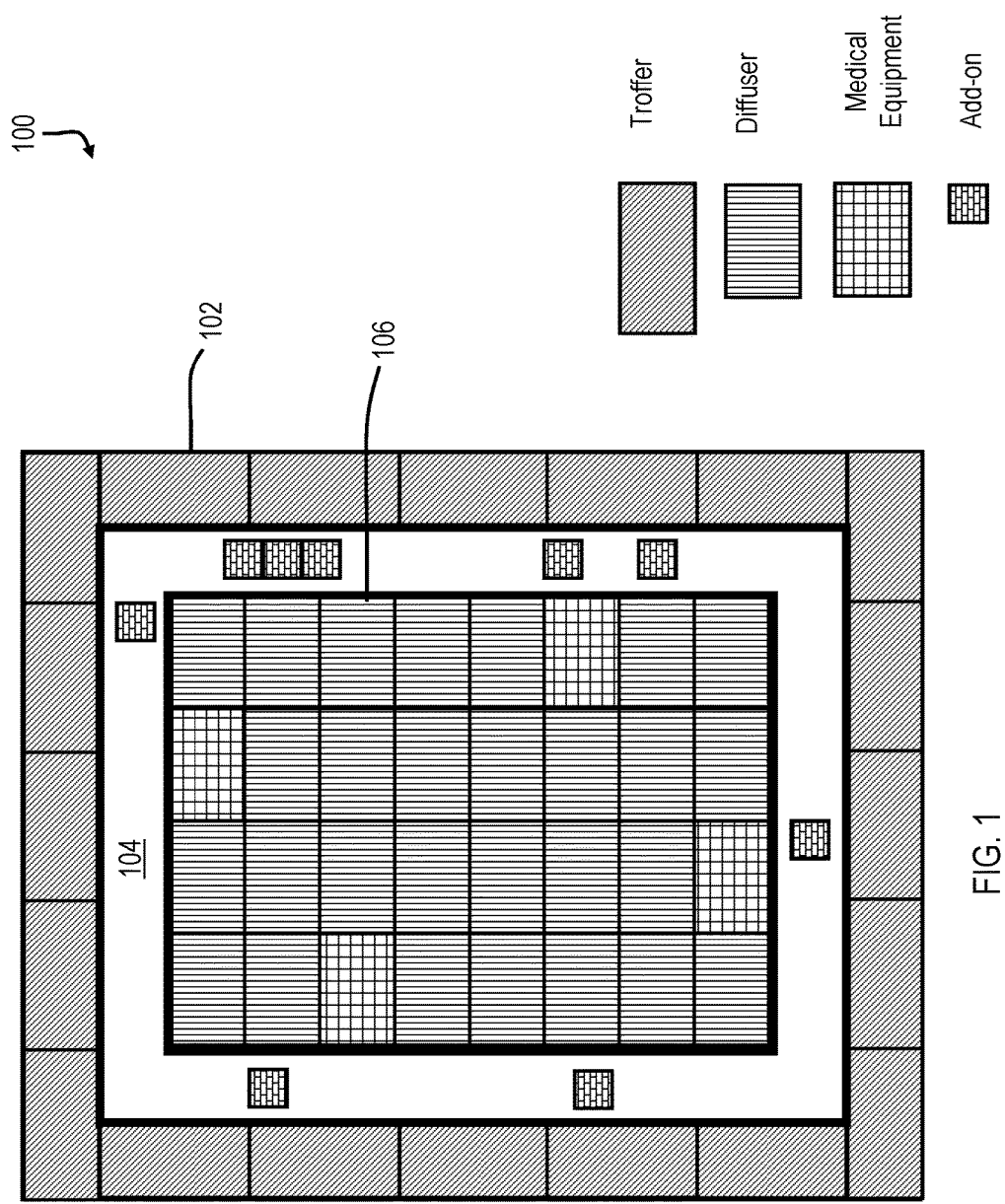
FIG. 1 depicts an operating room ceiling system configured according to one embodiment of the present disclosure.

In the following detailed description of exemplary embodiments of the invention, specific exemplary embodiments in which the invention may be practiced are described in sufficient detail to enable those skilled in the art to practice the invention, and it is to be understood that other embodiments may be utilized and that architectural, mechanical, electrical and other changes may be made without departing from the spirit or scope of the present invention. The following detailed description is, therefore, not to be taken in a limiting sense, and the scope of the present invention is defined only by the appended claims and their equivalents. As used herein, the terms 'raceway' and 'conduit' are synonymous and include an enclosure that facilitates routing items (e.g., electrical cables, electrical wires and conduit, and medical gas lines) from an entry point in the enclosure to an exit point in the enclosure.

According to the present disclosure, renovation of an operating room can be performed in a reduced amount of time and at a lower expense, as contrasted with conventional approaches, by employing an operating room ceiling system configured according to the present disclosure. According to one or more embodiments, an operating room can be readily upgraded to conform to changes in operating room procedures and be readily adapted for new equipment required for operating room upgrades. In one embodiment, an operating room ceiling system is positioned to occupy an approximately thirteen feet by seventeen feet area in an operating room ceiling above a surgical table in an operating room. In at least one embodiment, an operating room ceiling system includes a center portion that includes ASHRAE approved air diffusers that provide clean air directly over a patient (and surgical staff) in a sterile field. In one or more embodiments, the air diffusers are surrounded by a ring of drop-in light fixtures (e.g., two feet by two feet light emitting diode (LED) light fixtures or fluorescent light fixtures).

In various embodiments, a rectangular sheet metal raceway assembly (e.g., eight inches by ten inches) is positioned between the light fixtures and the air diffusers. In various embodiments, the raceway assembly includes removable side and bottom panels. The removable bottom panels may be mounted flush with the ceiling. In various embodiments, an intermediate structure that is configured to support ceiling mounted booms and lights for the operating room is located above the ring of light fixtures. In one or more embodiments, the raceway assembly allows medical gas, electrical cables, and communications cables to be distributed around the entire raceway assembly.

In various embodiments, components enter a desired area in the raceway assembly and are then distributed to where ceiling mounted equipment is to be located. In one or more embodiments, the ceiling mounted equipment is mechanically coupled to a structural support by an intermediate structure that receives a portion of the raceway assembly and includes an equipment mounting plate. The raceway assembly allows medical gas, electrical cables, and communication cables to be readily rerouted if the ceiling mounted equipment is moved or upgraded or additional ceiling mounted equipment is added. The disclosed techniques generally result in lower installation cost, faster turn around time, and minimal to no containment is required during an equipment upgrade.

With the complete structural support positioned above the raceway assembly, equipment can be placed anywhere in the area. If new equipment is required to be installed, the location of the new equipment is not limited by the placement of the old equipment and can be located anywhere on the raceway assembly or adjacent to the raceway assembly by moving or installing a new intermediate structure. The light fixture ring allows for ample lighting of the patient area, access to ceiling mounted equipment, and one or more light fixtures can be readily removed to provide access to an interior of the raceway assembly. In addition, the center air diffuser provides a clean patient area.

In one or more embodiments, an operating room ceiling system includes an air diffuser assembly, a raceway assembly, and a light assembly. The air diffuser assembly includes a number of filtered air vents that are used to disperse clean air over an operating table. For example, the air diffuser assembly may include a plurality of high-efficiency particle absorption (HEPA) filtered air vents or non-HEPA filtered air vents. In various embodiments, the air vents are configured to comply with ASHRAE specifications (e.g., the air vents are positioned to encompass an operating table area and one foot outside of the operating table area).

In a least one embodiment, the light assembly includes a number of lay-in troffers (e.g., LED troffers or fluorescent troffers) that are positioned around the raceway assembly, which is positioned between the light assembly and the air diffuser assembly. The raceway assembly is configured to facilitate routing of communication cables, power cables, and medical gas lines and removable panels (e.g., held in place by fasteners, such as screws or bolts) of the raceway assembly may include various communication, power, and medical gas connectors. For example, the bottom removable panels may include one or more of medical gas hose drops, electrical drops, video drops, speakers, a differential pressure alarm, a smoke detector, surgical lights, lightweight booms, directional lighting, monitor arms, and a microphone.

A support structure integrated above the ceiling is configured to support the operating room ceiling system and ceiling mounted surgical equipment (anesthesia booms, surgical lights, etc.) via an intermediate structure. In various embodiments, surgical equipment may be positioned anywhere within the diffuser assembly approximate the raceway assembly. According to various aspects of the present disclosure, additional surgical equipment can be added with little to no structural support cost. Moreover, an operating room ceiling system configured according to the present disclosure may be readily re-configured as needed. For example, removable bottom panels and side panels of a raceway assembly may be relocated to another location on the raceway assembly (or replaced with new panels) when various equipment requires relocation.

In various embodiments, communication cables are pulled into the raceway assembly and routed to specific equipment. In one or more embodiments, medical gas is hard piped to a top wall of the raceway assembly and a hose inside the raceway assembly is employed to deliver the gas to a desired location (on a bottom panel of the raceway assembly). Similarly, power is provided inside the raceway assembly and conduit and junction-boxes may be employed to distribute power throughout the raceway assembly.

As noted above, the raceway assembly may be used to distribute medical gas lines, power cables, and/or communication cables to various ceiling mounted surgical equipment, as well as any other devices that are incorporated into the raceway assembly. In one or more embodiments, the raceway assembly includes several sheet metal raceway boxes (e.g., approximately eight inches wide and ten inches tall) with removable side and bottom panels (that when removed provide access to an interior of the raceway assembly). For example, the sheet metal raceway boxes may connect together end-to-end to provide a complete passageway around a diffuser assembly. In at least one embodiment, the metal raceway boxes are configured such that any thing that enters an interior of the raceway assembly at one location can be routed to any other location in the raceway assembly. In at least one embodiment, equipment is incorporated into the raceway assembly (e.g., instead of or in addition to the diffuser assembly).

With reference to FIG. 1, an operating room ceiling system 100 includes an air diffuser assembly 106, a raceway assembly 104, and a light assembly 102. As is illustrated, the raceway assembly 104 is positioned along an outer perimeter of the air diffuser assembly 106. As is also illustrated, the light assembly 102 is positioned along an outer perimeter of the raceway assembly 104. In at least one embodiment, the light assembly 102 includes a plurality of LED troffers (twenty of which are depicted). In another embodiment, the light assembly 102 includes a plurality of fluorescent troffers. It should be appreciated that the light assembly 102 may include more or less than twenty troffers.

Figure 2:
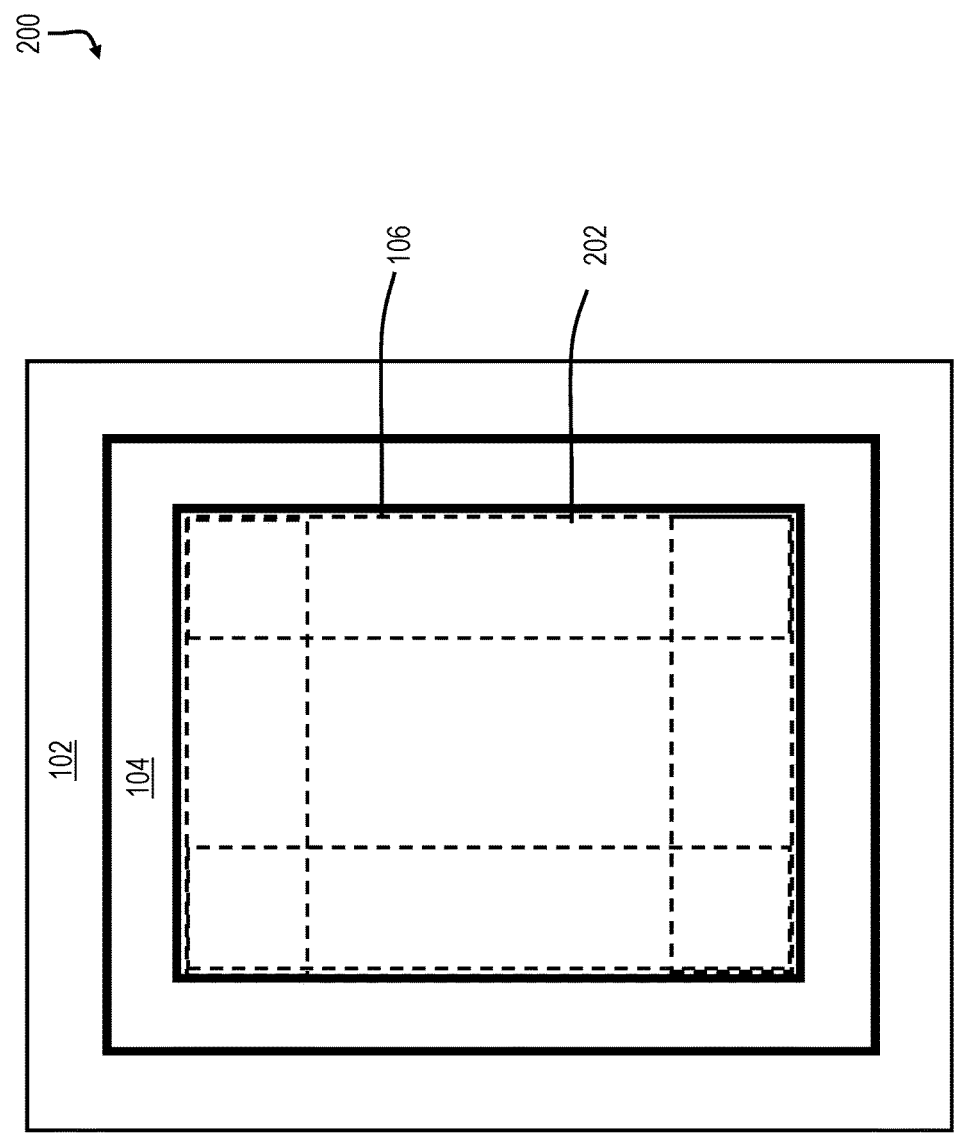
FIG. 2 further illustrates a location of a support structure for the operating room ceiling system of FIG. 1.

In at least one embodiment, the raceway assembly 104 includes a number of add-ons (e.g., medical gas hose drops, electrical drops, video drops, speakers, a differential pressure alarm, a smoke detector, surgical lights, lightweight booms, directional lighting, monitor arms, and a microphone). While nine add-ons are illustrated in FIG. 1, it should be appreciated that a raceway assembly configured according to the present disclosure may include more or less than nine add-ons. In at least one embodiment, the air diffuser assembly 106 includes HEPA diffusers and various medical equipment (e.g., anesthesia booms, surgical lights, etc.). In another embodiment, the air diffusers are non-HEPA diffusers. It should be appreciated that an air diffuser assembly configured according to the present disclosure may include more or less than the number of air diffusers and medical equipment depicted. With reference to FIG. 2, a support structure 202 is illustrated as being located above the air diffuser assembly 106 of an operating room ceiling system 200.

Figure 3:
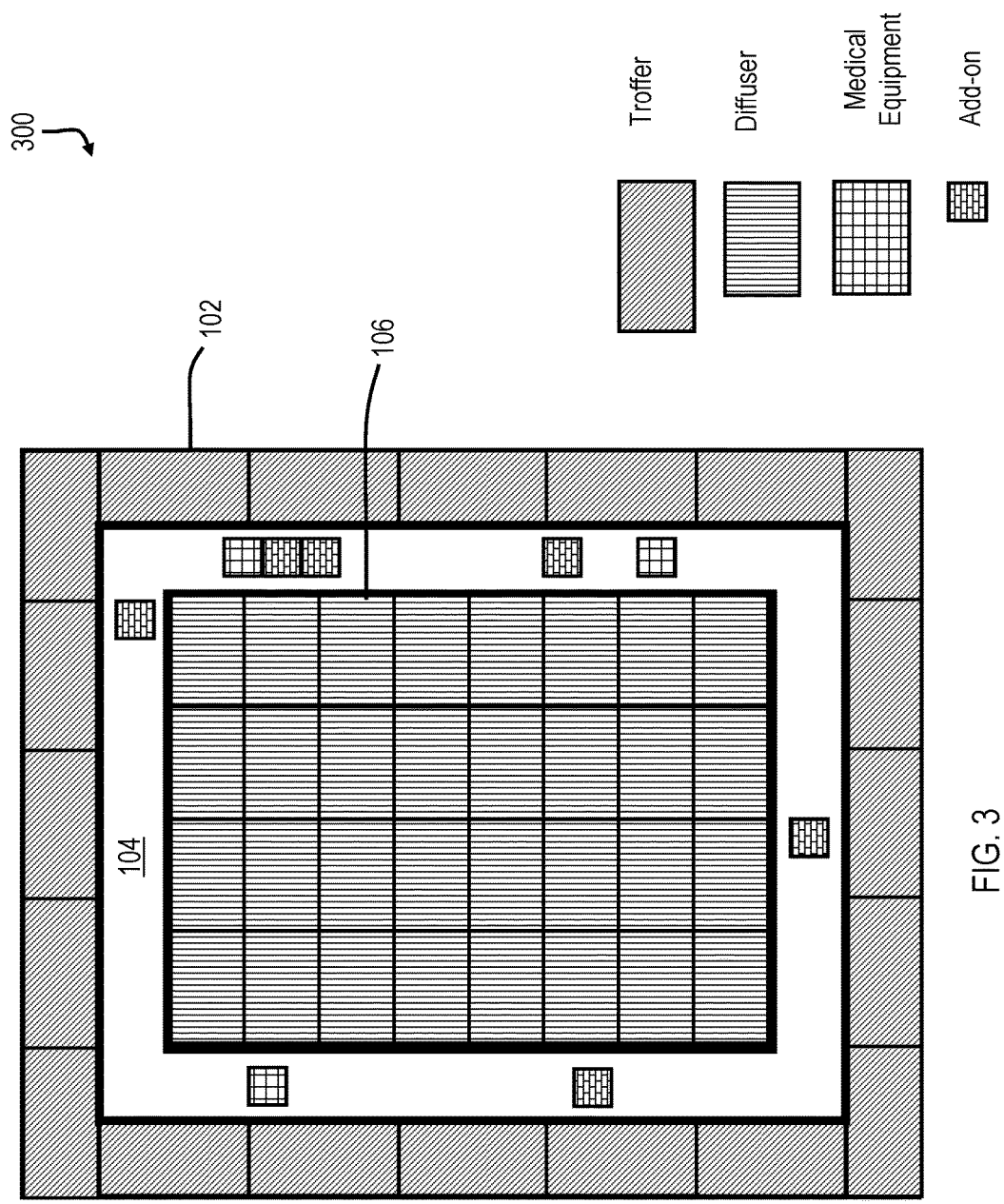
FIG. 3 depicts an operating room ceiling system configured according to another embodiment of the present disclosure.

With reference to FIG. 3, an operating room ceiling system 300 includes an air diffuser assembly 106, a raceway assembly 104, and a light assembly 102. As is illustrated, the raceway assembly 104 is positioned along an outer perimeter of the air diffuser assembly 106. As is also illustrated, the light assembly 102 is positioned along an outer perimeter of the raceway assembly 104. In at least one embodiment, the light assembly 102 includes a plurality of troffers (twenty of which are depicted). It should be appreciated that the light assembly 102 may include more or less than twenty troffers (e.g., LED, fluorescent, or incandescent troffers).

Figure 4:
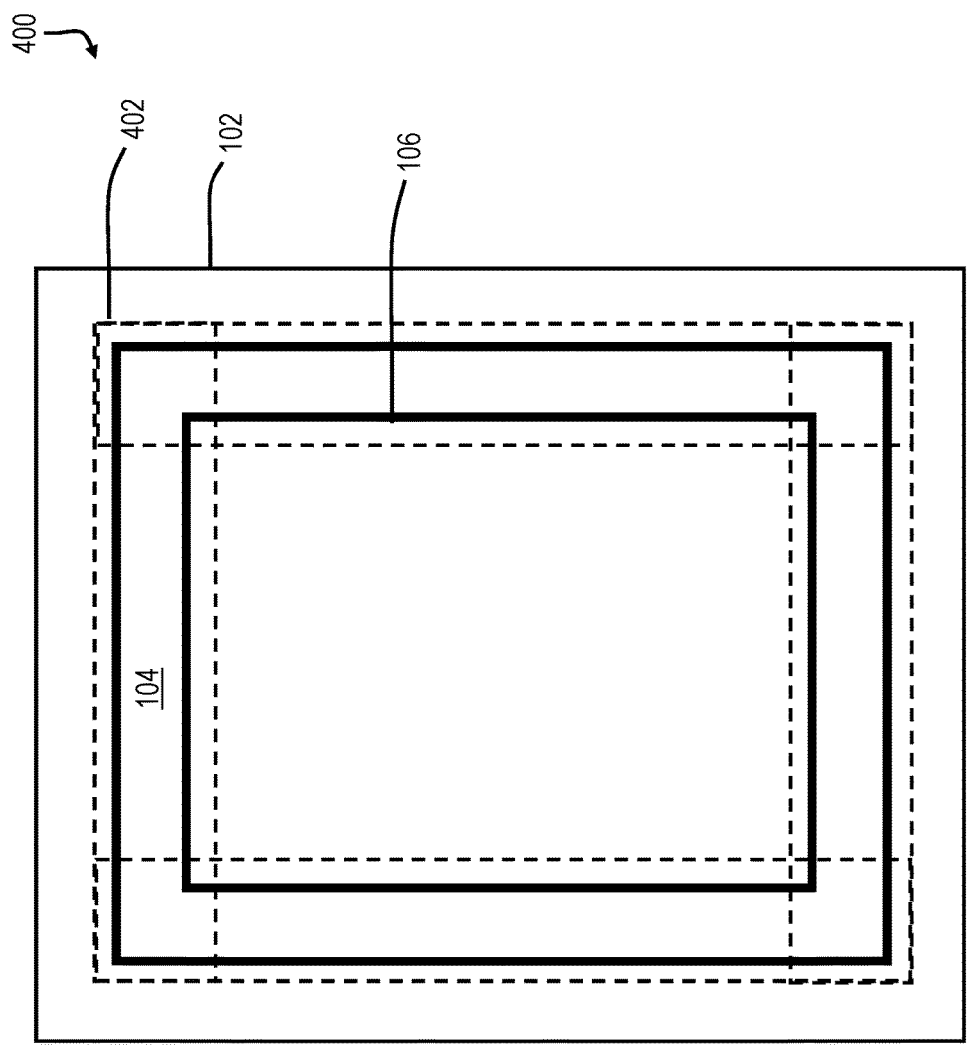
FIG. 4 further illustrates a location of a support structure for the operating room ceiling system of FIG. 3.

In at least one embodiment, the raceway assembly 104 includes a number of add-ons (e.g., medical gas hose drops, electrical drops, video drops, speakers, a differential pressure alarm, a smoke detector, surgical lights, lightweight booms, directional lighting, monitor arms, and a microphone) in addition to medical equipment. While six add-ons and three medical equipment are illustrated in FIG. 3, it should be appreciated that a raceway assembly configured according to the present disclosure may include more or less than six add-ons and three medical equipment. In at least one embodiment, the air diffuser assembly 106 includes air diffusers (e.g., HEPA or non-HEPA diffusers) and various medical equipment (anesthesia booms, surgical lights, etc.). It should be appreciated that an air diffuser assembly configured according to the present disclosure may include more or less than the number of air diffusers depicted. With reference to FIG. 4, a support structure 402 is illustrated as being located above the raceway assembly 104 to support medical equipment associated with the raceway assembly 104.

Figure 5:
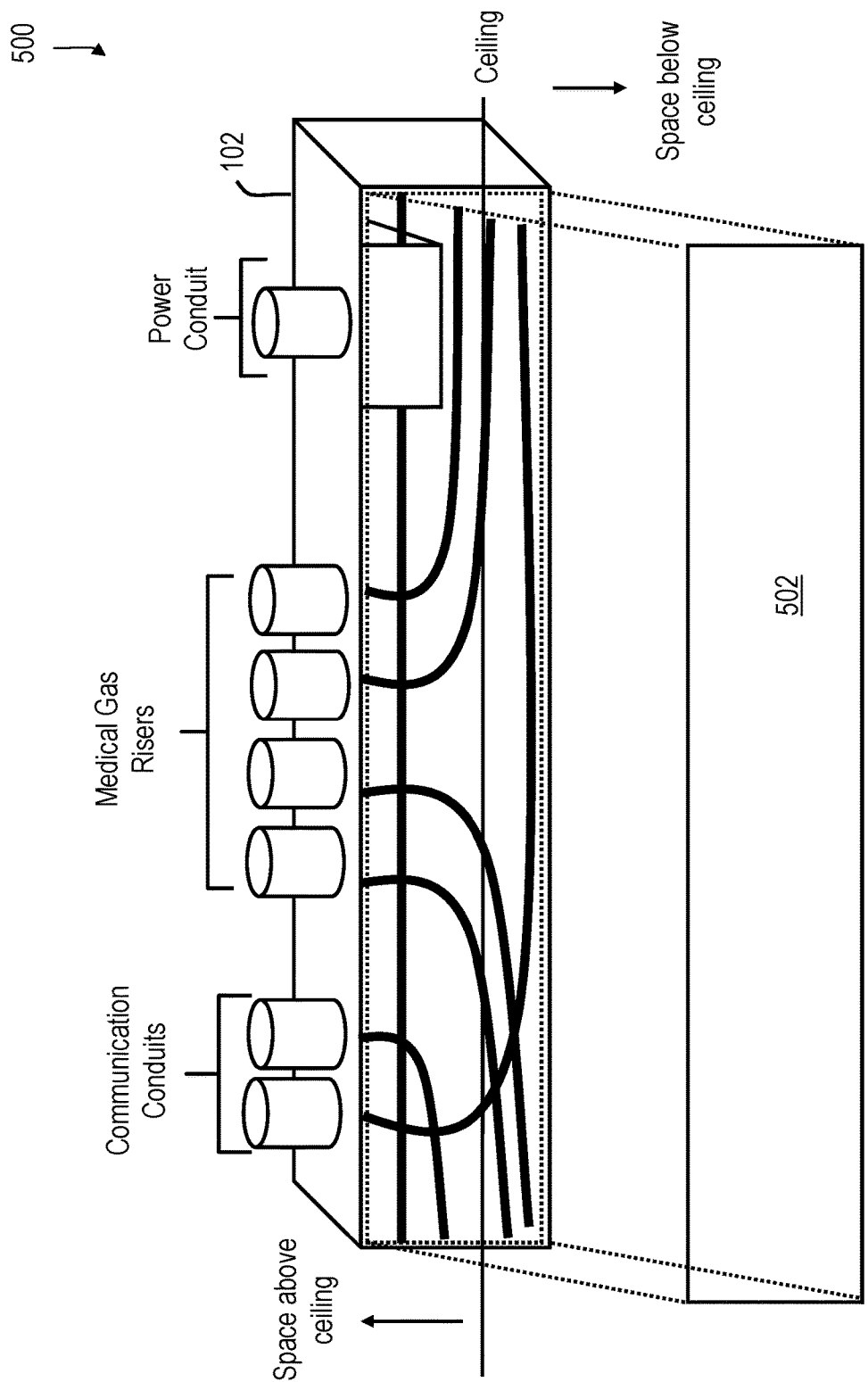
FIG. 5 depicts how medical gas lines, electrical power cables, and communication cables may enter a raceway assembly of an operating room ceiling system and be routed through the raceway assembly to a desired location, according to one embodiment of the present disclosure.
Figure 6:
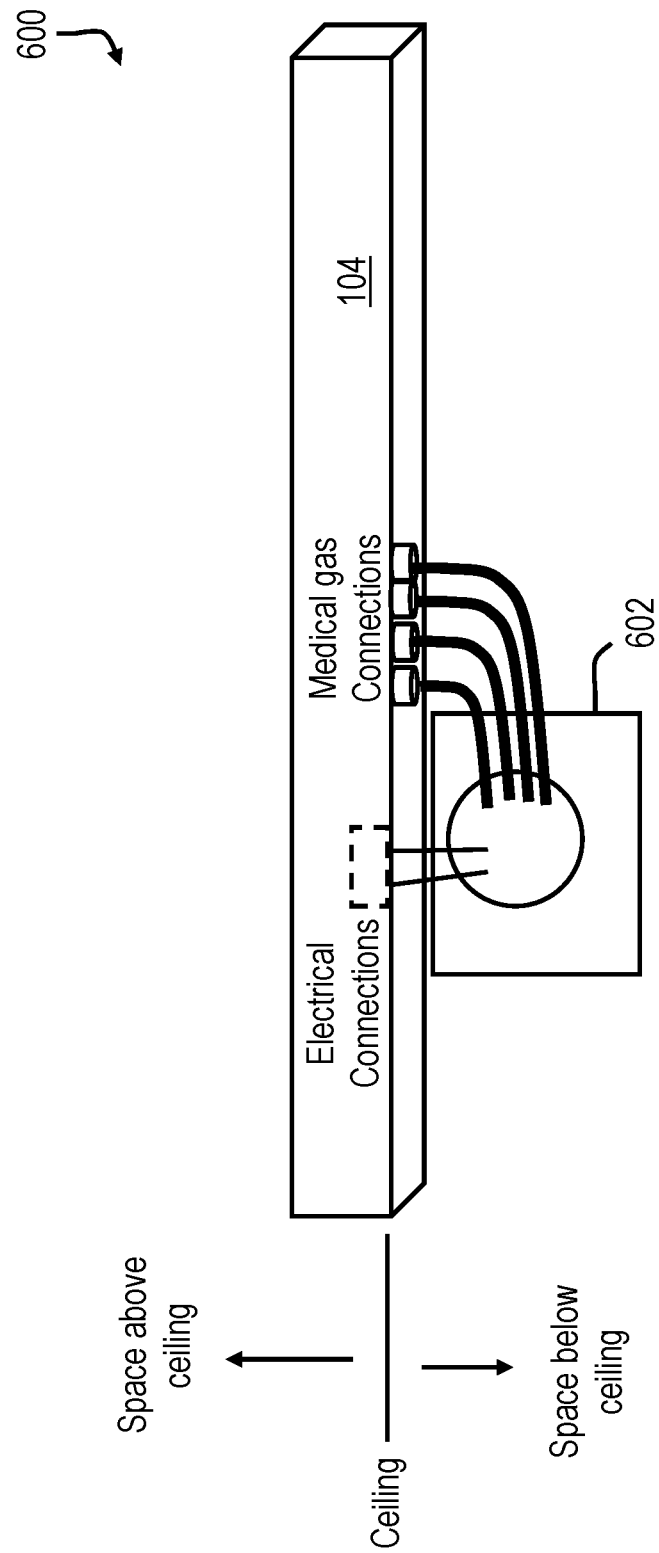
FIG. 6 depicts electrical and medical gas connections for an anesthesia boom associated with an operating room system ceiling system configured according to the present disclosure.

With reference to FIG. 5, a diagram 500 depicts how medical gas lines, electrical power cables and conduits, and communication cables enter the raceway assembly 104 and are dispersed throughout the raceway assembly 104. The view is from the inside with side panel 502 removed. With reference to FIG. 6, a diagram 600 depicts an anesthesia boom 602 coupled to the raceway assembly 104 via, for example, an intermediate structure (not shown in FIG. 6). In general, anesthesia booms usually have four to six inch whips for electrical and four to six inch hoses for medical gas. In one or more embodiments, the medical gas and power enter into the raceway assembly 104 as per FIG. 6 and are then routed to the side of the raceway assembly 104 where the whips and hoses connect.

Figure 7:
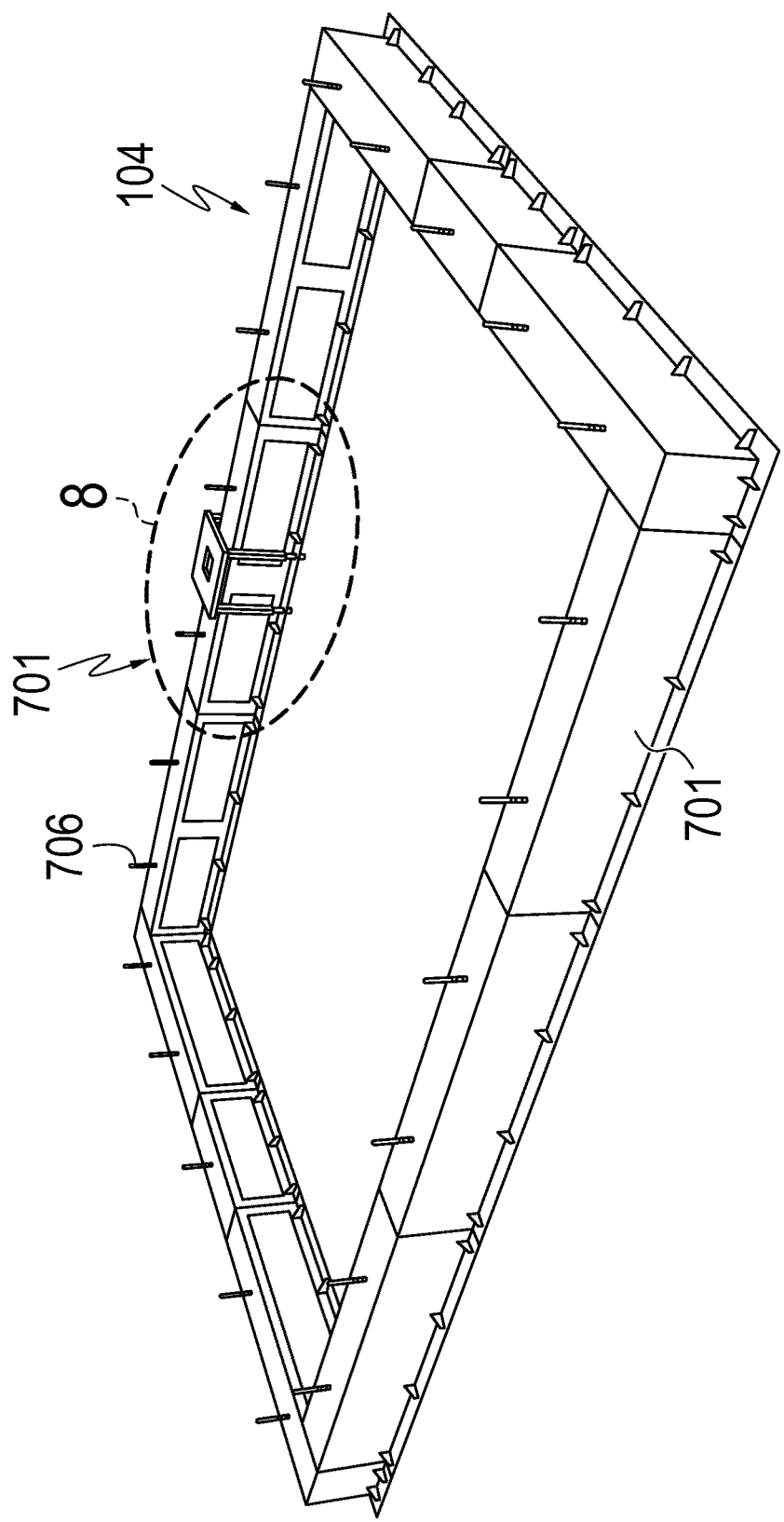
FIG. 7 illustrates a raceway assembly (made up of several raceway sections that are coupled together), according to an embodiment of the present disclosure.

With reference to FIG. 7, the raceway assembly 104 is further illustrated as including a plurality of raceway boxes 701 that are coupled together using fasteners (e.g., bolts and/or screws), according to one embodiment. While the raceway assembly 104 is illustrated as including twelve raceway boxes 701 (some of which have different lengths) it should be appreciated that a raceway assembly configured according to the present disclosure may include more or less than twelve raceway boxes (all of which may have the same length and/or different lengths). The raceway assembly 104 is supported by threaded bolts 706, one end of which is attached to the raceway assembly 104 using one or more nuts and on opposite end of which is attached to a support structure (not shown in FIG. 7 (see FIG. 9)) using one or more nuts.

Figure 8:
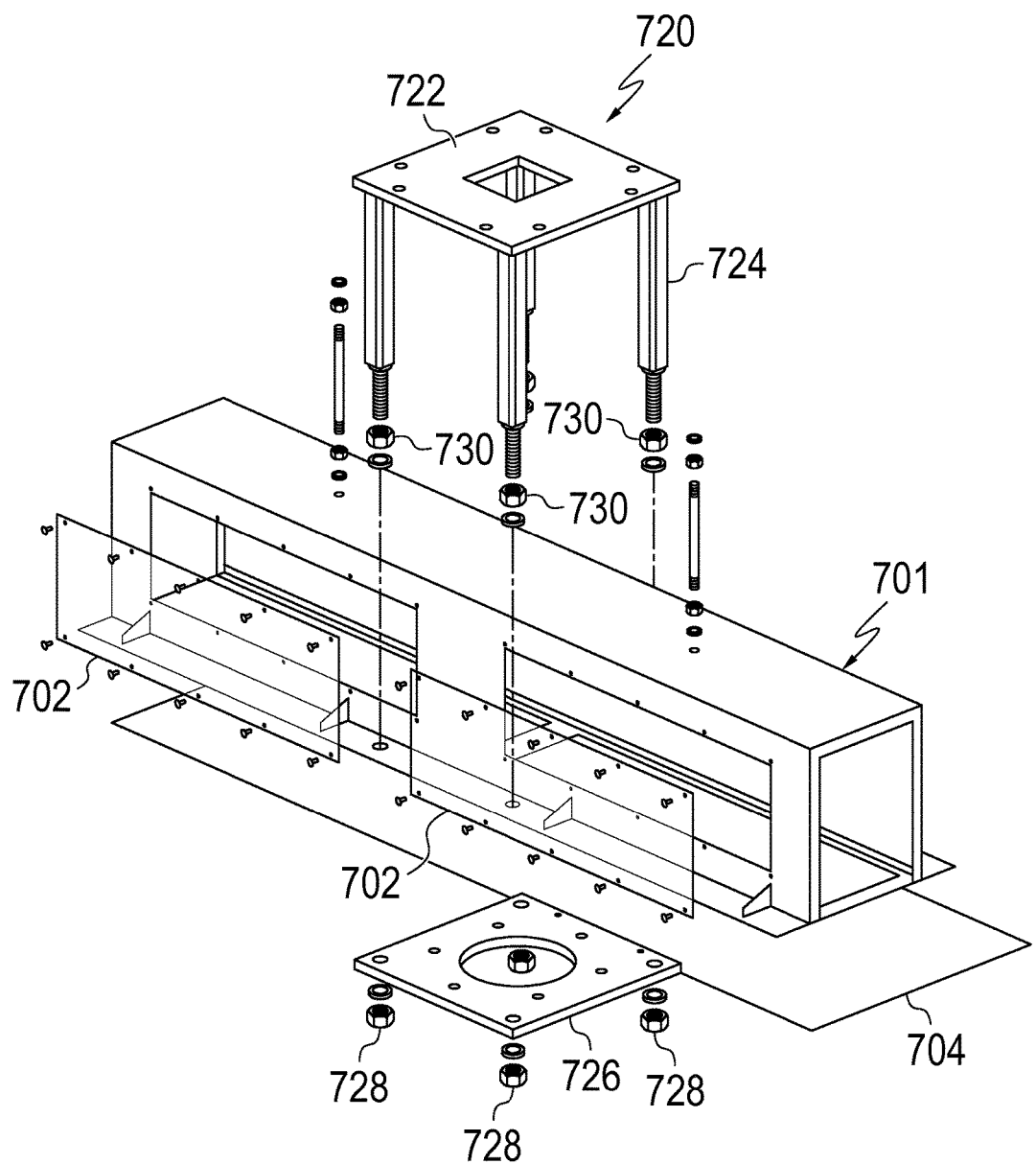
FIG. 8 illustrates a section of a raceway assembly in conjunction with an intermediate support according to another embodiment of the present disclosure.
Figure 9:
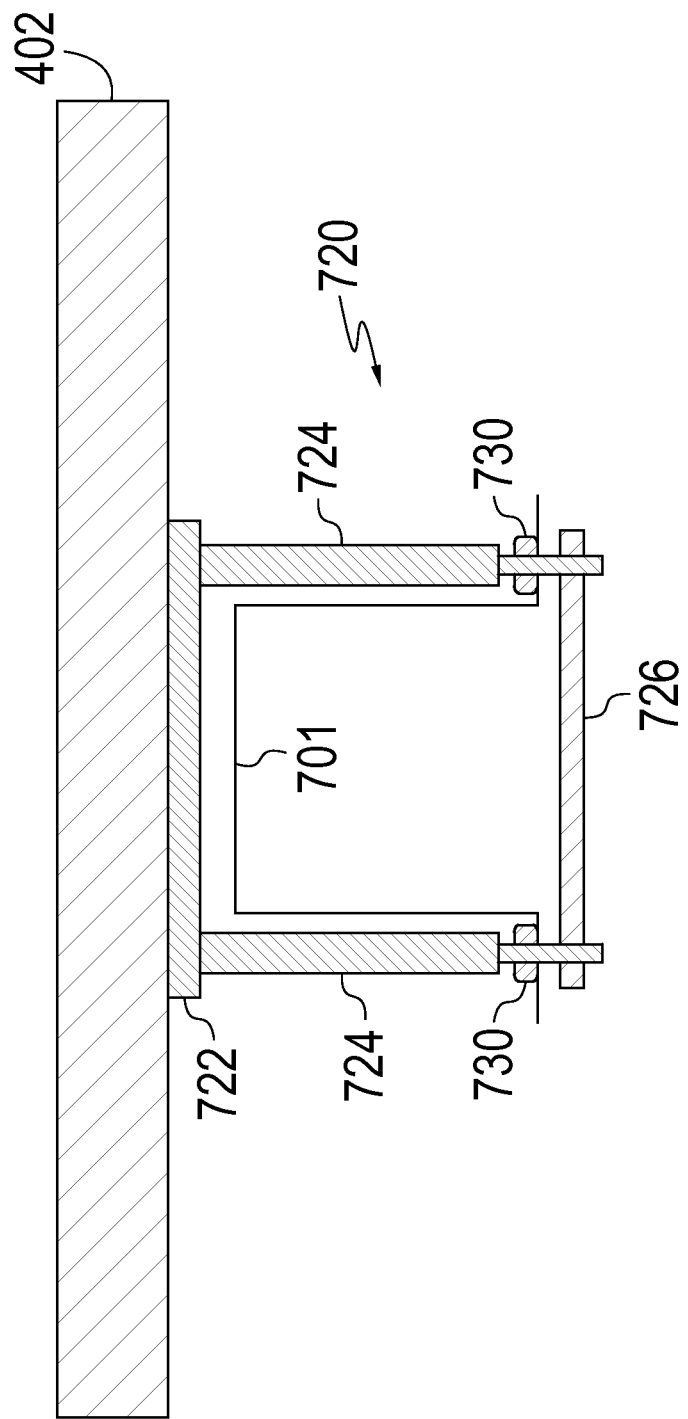
FIG. 9 illustrates an intermediate structure that mechanically attaches to a structural support and includes an equipment mounting plate that may be mechanically coupled to various equipment (surgical light, monitor arm, anesthesia boom, etc.), according to an embodiment of the present disclosure.

As is illustrated best in FIG. 8, the raceway boxes 701 of the raceway assembly 104 include side panels 702 and bottom panels 704, which may be removed to provide access to an interior of the raceway assembly 104. An intermediate structure 720 is illustrated as including a top plate 722 with four legs 724 extending from the top plate 722. The legs 724 are spaced to receive the raceway boxes 701. The top plate 722 is configured to be attached to a support structure. The intermediate structure 720 also includes an equipment plate 726 that is utilized to support various equipment that is attached to the equipment plate 726. The equipment plate 726 is mechanically coupled to the legs 724 using fasteners (e.g., nuts 728 and 730 that thread onto threaded portions of the legs 724). As is illustrated in FIG. 9, the intermediate structure 720 is coupled to the support structure 402, which is located above a room ceiling. For example, the top plate 722 of the intermediate structure 720 may be coupled to the support structure 402 using fasteners (e.g., bolts and nuts).

Figure 10:
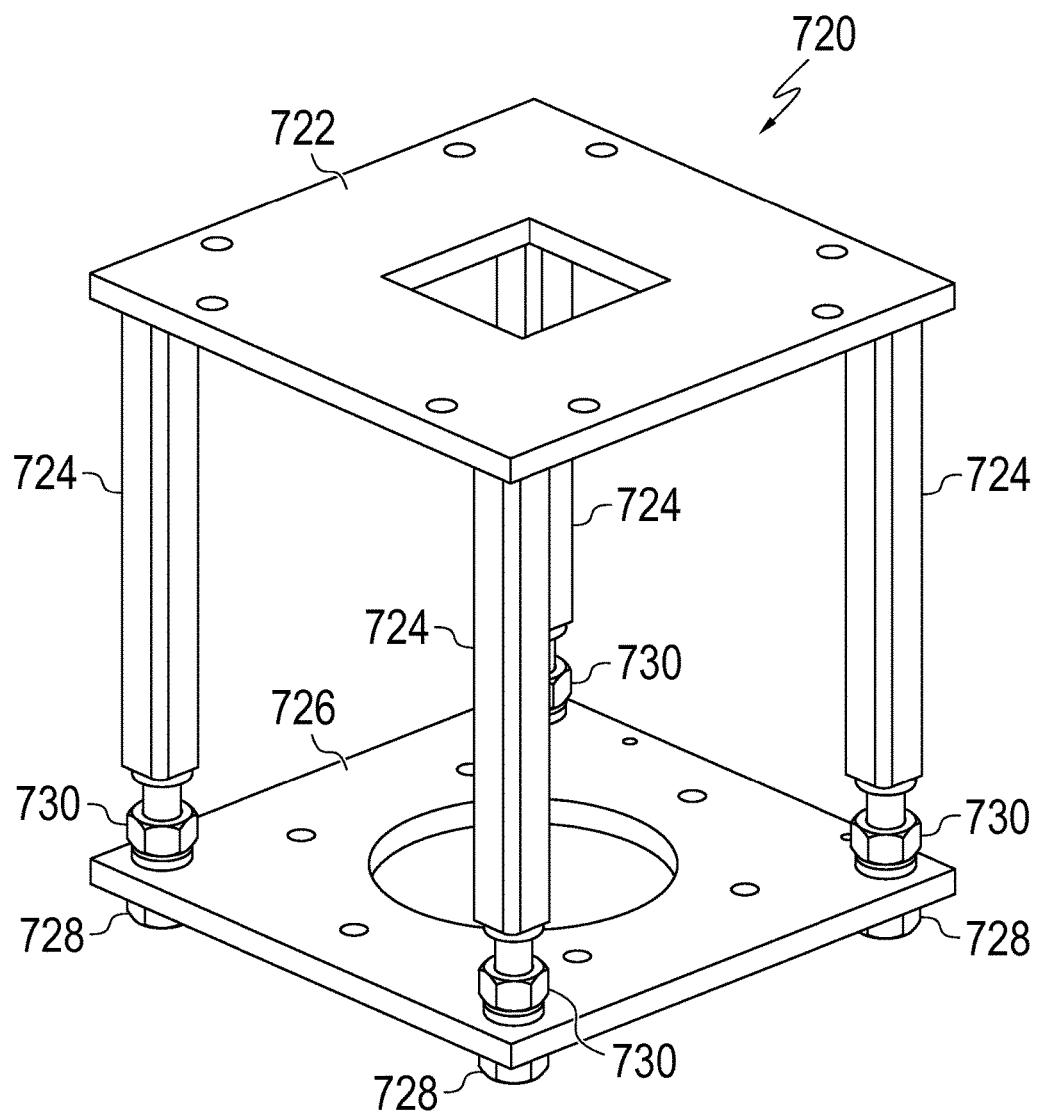
FIG. 10 illustrates an intermediate structure, configured according to an embodiment of the present disclosure, in additional detail.

With reference to FIG. 10, the intermediate structure 720 is further illustrated. As previously mentioned, the intermediate structure includes, the top plate 722 with the legs 724 extending from the top plate 722. As previously noted, the legs 724 are spaced to receive the raceway boxes 701. The top plate 722 is configured to be attached to a support structure. The intermediate structure 720 also includes the equipment plate 726, which is utilized to support various equipment that is attached to the equipment plate 726. The equipment plate 726 is mechanically coupled to the legs 724 using the nuts 728 and 730, which thread onto threaded portions of the legs 724.

Figure 11:
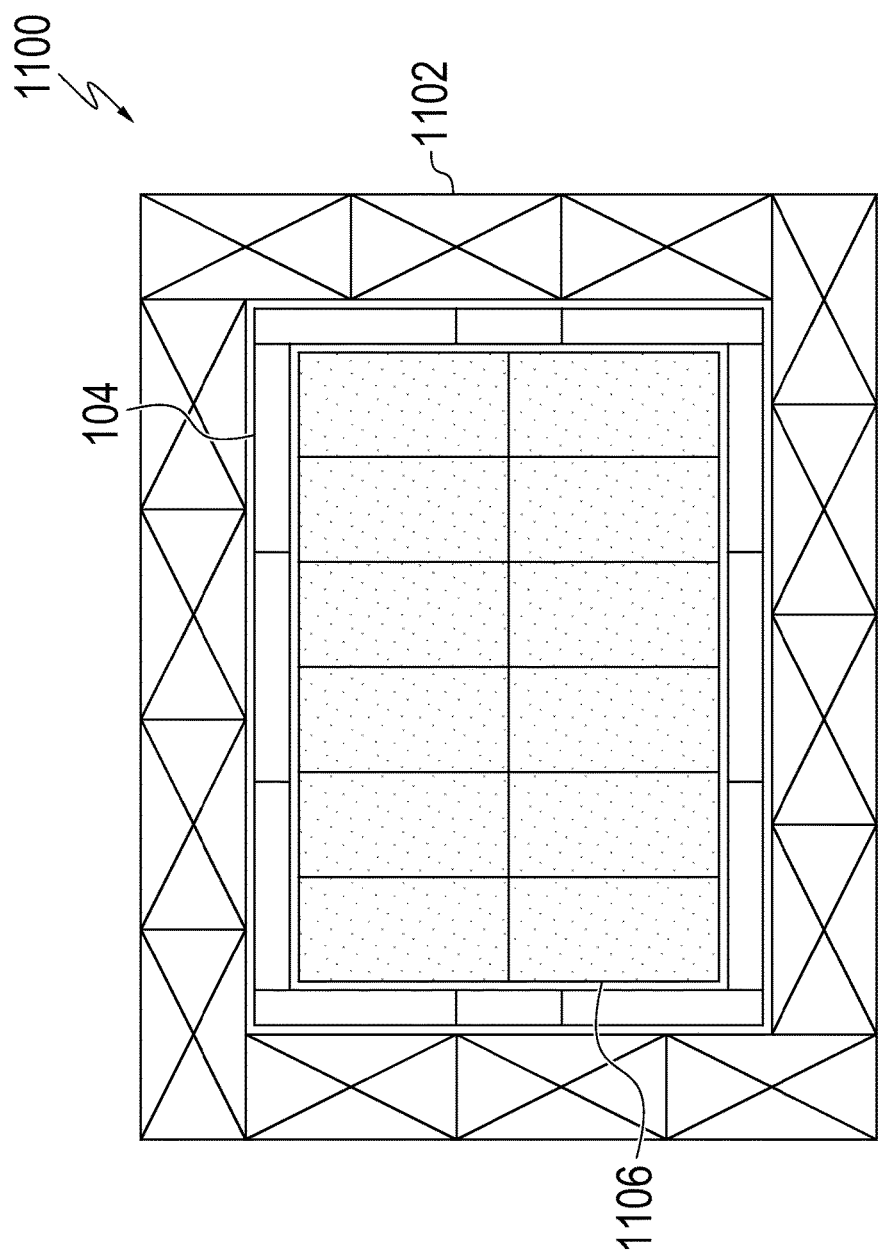
FIG. 11 illustrates an operating room ceiling system, according to another embodiment of the present disclosure.

With reference to FIG. 11, an operating room ceiling system 1100 is illustrated that includes an air diffuser assembly 1106, a raceway assembly 104, and a light assembly 1102. As is illustrated, the raceway assembly 104 is positioned along an outer perimeter of the air diffuser assembly 1106. As is also illustrated, the light assembly 1102 is positioned along an outer perimeter of the raceway assembly 104. In the illustrated embodiment, the light assembly 1102 includes fourteen troffers. The troffers may be, for example, LED troffers, fluorescent troffers, or incandescent troffers. It should be appreciated that the light assembly 1102 may include more or less than fourteen troffers. As is shown in FIG. 11, the air diffuser assembly 1106 includes twelve air diffusers. The air diffusers may be, for example, HEPA or non-HEPA air diffusers. It should be appreciated that an air diffuser assembly configured according to the present disclosure may include more or less than the number of air diffusers depicted.

Accordingly, a number of operating room ceiling systems have been described herein that can be readily configured for relocation of surgical equipment and/or to support additional equipment.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A ceiling system, comprising:
   an air diffuser assembly;
   a raceway assembly positioned along an outer perimeter of the air diffuser assembly; and
   a light assembly positioned along an outer perimeter of the raceway assembly, wherein the raceway assembly forms a rectangular conduit and includes an interior configured to accept power cables, medical gas lines, and communication cables for routing and the raceway assembly includes one or more removable panels that, when removed, provide access to the interior of the rectangular conduit.

2. The system of claim 1, wherein the air diffuser assembly includes a plurality of high-efficiency particle absorption (HEPA) diffusers.

3. The system of claim 1, wherein the one or more removable panels include one or more of power connectors, medical gas connectors, and communication connectors.

4. The system of claim 1, wherein the one or more removable panels include one or more of medical gas hose drops, electrical drops, video drops, speakers, a differential pressure alarm, a smoke detector, surgical lights, lightweight booms, can lighting, and a microphone, and wherein at least some of the one or more removable panels are configured to be relocated to a different location on the raceway assembly to facilitate reconfiguration of the ceiling system.

5. The system of claim 1, wherein the system is configured to be attached to a support structure mounted above a room ceiling.

6. The system of claim 1, wherein the light assembly includes a plurality of light emitting diode (LED) troffers.

7. An operating room ceiling system, comprising:
   an air diffuser assembly;
   a raceway assembly positioned along an outer perimeter of the air diffuser assembly; and
   a light assembly positioned along an outer perimeter of the raceway assembly, wherein the raceway assembly is constructed of sheet metal that forms a rectangular conduit and includes an interior configured to accept power cables, medical gas lines, and communication cables for routing and the raceway assembly includes one or more removable panels that, when removed, provide access to the interior of the rectangular conduit.

8. The system of claim 7, wherein the air diffuser assembly includes a plurality of high-efficiency particle absorption (HEPA) diffusers.

9. The system of claim 7, wherein the one or more removable panels include one or more of power connectors, medical gas connectors, and communication connectors.

10. The system of claim 7, wherein the one or more removable panels include one or more of medical gas hose drops, electrical drops, video drops, speakers, a differential pressure alarm, a smoke detector, surgical lights, lightweight booms, can lighting, and a microphone, and wherein at least some of the one or more removable panels are configured to be relocated to a different location on the raceway assembly to facilitate reconfiguration of the ceiling system.

11. The system of claim 7, wherein the system is configured to be attached to a support structure mounted above a room ceiling.

12. The system of claim 7, wherein the light assembly includes a plurality of light emitting diode (LED) troffers.

13. The system of claim 7, wherein the light assembly includes a plurality of fluorescent troffers.

14. The system of claim 7, further comprising:
   an intermediate structure including an equipment mounting plate configured to support equipment, wherein the intermediate structure is configured to attach the equipment to a structural support.

15. The system of claim 14, wherein the intermediate structure includes a top plate that is configured to be attached to the structural support and four spaced legs that attach to the equipment mounting plate, and wherein the four spaced legs are each positioned at different corners of the top plate and are spaced to receive a section of the raceway assembly.

16. An operating room ceiling system, comprising:
   an air diffuser assembly including a plurality of air filters;
   a raceway assembly positioned along an outer perimeter of the air diffuser assembly, wherein the raceway assembly includes an interior that provides a raceway to facilitate cable routing and includes one or more removable bottom panels, and wherein an interior perimeter of the raceway assembly completely encompasses the outer perimeter of the air diffuser assembly;
   a light assembly positioned along an outer perimeter of the raceway assembly; and
   an intermediate structure including an equipment mounting plate configured to support equipment, wherein the intermediate structure is configured to attach the equipment to a structural support and includes four legs spaced to receive a section of the raceway assembly.

* * * * *